United States Patent [19]

Hsiao

[11] Patent Number: 5,619,563
[45] Date of Patent: Apr. 8, 1997

[54] MNEMONIC NUMBER DIALING PLAN

[75] Inventor: Alaric S. Hsiao, Shrewsbury, N.J.

[73] Assignee: Lucent Technologies Inc., Murray Hill, N.J.

[21] Appl. No.: 359,269

[22] Filed: Dec. 19, 1994

[51] Int. Cl.⁶ .................................................. H04M 1/27
[52] U.S. Cl. ........................... 379/368; 379/354; 379/355
[58] Field of Search ................................. 379/368, 354, 379/355, 357, 97, 96; 341/28, 20, 23; 364/419, 900

[56] References Cited

U.S. PATENT DOCUMENTS

| | | | |
|---|---|---|---|
| 4,180,798 | 12/1979 | Komori et al. | 340/146.3 |
| 4,427,848 | 1/1984 | Tsakanikas | 379/88 |
| 4,674,112 | 6/1987 | Kondraske et al. | 379/97 |
| 4,777,600 | 10/1988 | Saito et al. | 364/419 |
| 5,031,206 | 7/1991 | Riskin | 379/97 |
| 5,117,455 | 5/1992 | Danish | 379/368 |

*Primary Examiner*—Krista M. Zele
*Assistant Examiner*—Jacques M. Saint-Surin

[57] ABSTRACT

A Mnemonic Number Dialing Plan is offered, having a telephone keyset which can be used in regions where the written language is based on a large number of characters or symbols. Selected phonetic characters of the known phonic character set are identified with the various numerical keys of the keypad in a relatively flexible association allowing adaptability to a number of different phonic character sets of varying size. The mnemonic to be translated into a telephone number preferably consists of a phrase, where the number of words corresponds with the number of digits in the telephone number, and only the first phonic sound of a word in the mnemonic phrase is used in mnemonic dialing.

10 Claims, 4 Drawing Sheets

| DIGIT | MNDP SYMBOLS |
|:---:|:---:|
| 2 | ㄅ, ㄆ, ㄇ |
| 3 | ㄈ, ㄉ, ㄊ |
| 4 | ㄋ, ㄌ, ㄍ |
| 5 | ㄎ, ㄏ, ㄐ |
| 6 | ㄑ, ㄒ, ㄓ |
| 7 | ㄔ, ㄕ, ㄖ |
| 8 | ㄗ, ㄘ, ㄙ |
| 9 | ㄧ, ㄨ, ㄩ |

FIG. 1

|  | CHINESE (MANDARIN) | PHONETIC REPRESENTATION | MNDP SYMBOL |
|---|---|---|---|
| MAINLAND (M) | 路 | lù | l |
| TAIWAN (T) | 路 | ㄌㄨˋ | ㄌ |

FIG. 2

| DIGIT | MNDP SYMBOLS |
|---|---|
| 2 | b, p, m |
| 3 | f, d, t |
| 4 | n, l, g |
| 5 | k, h, j |
| 6 | q, x, ẑ |
| 7 | ĉ, ŝ, r |
| 8 | z, c, s |
| 9 | i, u, ü |

FIG. 3

| DIGIT | MNDP SYMBOLS |
|---|---|
| 2 | ㄅ, ㄆ, ㄇ |
| 3 | ㄈ, ㄉ, ㄊ |
| 4 | ㄋ, ㄌ, ㄍ |
| 5 | ㄎ, ㄏ, ㄐ |
| 6 | ㄑ, ㄒ, ㄓ |
| 7 | ㄔ, ㄕ, ㄖ |
| 8 | ㄗ, ㄘ, ㄙ |
| 9 | ㄧ, ㄨ, ㄩ |

FIG. 4A

| ENGLISH PHRASE | THANK YOU FOR USING AT&T. | | | | | | |
|---|---|---|---|---|---|---|---|
| CHINESE WRITING | 美 | 国 | 电 | 话 | 谢 | 谢 | 你 |
| MNDP (M) STRING | m | g | d | h | x | x | n |
| MNDP (T) STRING | ㄇ | ㄍ | ㄉ | ㄏ | ㄒ | ㄒ | ㄋ |
| PHONE NUMBER | 2 | 4 | 3 | 5 | 6 | 6 | 4 |

FIG. 4B

| ENGLISH PHRASE | PLEASE FLY CHINA AIRLINE. | | | | | | |
|---|---|---|---|---|---|---|---|
| CHINESE WRITING | 请 | 搭 | 坐 | 华 | 航 | 客 | 机 |
| MNDP (M) STRING | q | d | z | h | h | k | j |
| MNDP (T) STRING | ㄑ | ㄉ | ㄗ | ㄏ | ㄏ | ㄎ | ㄐ |
| PHONE NUMBER | 6 | 3 | 8 | 5 | 5 | 5 | 5 |

MNEMONIC NUMBER DIALING PLAN

BACKGROUND OF THE INVENTION

This invention relates to mnemonic telephone dialing systems, and more particularly, to such telephone dialing systems useable in Asian language regions.

Conventional telephones usually include a dialing keypad with at least 10 keys associated with the digits 0 to 9, respectively. In addition, many of the keys are associated with alphabetic characters. In the United States the numerical keys 2 through 9 are associated with the 24 alphabet characters A through Y, minus Q. The presence of the alphabet characters on the keypad makes mnemonic telephone dialing possible. For example, the telephone number 1-800-366-4667 can be dialed using the easy to remember sequence 1-800-DOMINOS. Telephone numbers can easily be remembered through such word association and can therefore be invaluable in advertising and product promotion.

Similar mnemonic systems by word association can be used in any Romance or Germanic language speaking country based on the 26 character Roman alphabet. The particular association of alphabetic characters with numerical digits may vary according to the language, but the basic concept of mnemonics by word association remains the same.

In Asian countries where the language is based on Chinese characters, such word association becomes virtually impossible. There are approximately 10,000 different Chinese characters. The educated Chinese will normally have a useful vocabulary of 2–3,000 characters. There does not appear to be any way of grouping the Chinese characters into a reasonable number of groups that could be associated with the 10 digit numerical keypad.

SUMMARY OF THE INVENTION

A feature of this invention is to provide a Mnemonic Number Dialing Plan (MNDP) useable in regions where the written language is based on a large number of characters or symbols. The invention is particularly applicable in countries using the Chinese characters, such as China, Taiwan, Japan and Korea.

In the system according to the invention characters of known phonic character sets are associated with the various numerical keys of the keypad. Each phonetic character must be associated with only one numerical key. In accordance with the invention, however, it is not necessary that all of the phonic characters be associated with numerical keys, nor is it necessary that all numerical keys be associated with phonic characters. Because of the relatively flexible association requirements, the invention can be adapted to a number of different phonic character sets of different sizes.

With the invention, phrase association is generally preferred over word association but, in some circumstances, word association can be used. With phrase association, only the first phonic sound of a word in the mnemonic phrase is used in mnemonic dialing.

Examples of known phonic character sets for different languages where the written language is based on the Chinese characters are as follows:

(1) The Pingyin character set used in Mainland China. See, for example, *The Modern Chinese Dictionary*, Chinese Publishing Bureau, Beijing, People's Republic of China.

(2) The Taiwanese phonetic characters. See, for example, *A New Practical Chinese-English Dictionary*, The Far East Book Co., LTD., Taiwan, Republic of China.

(3) The Katagana and Hiragana character sets used in Japan. See, for example, *Kenkyusha's Furigana English-Japanese Dictionary*, Kenkyuska, Japan.

(4) The Korean alphabet used in Korea. See, for example, *An Introductory Course In Korean* by Fred Lukoff, Yonsci University Press.

There are 36 phonetic characters in the character sets for Mandarin Chinese. The character set for Mainland China is different from the character set for Taiwan, but both consist of 36 characters for the sounds in the Mandarin Chinese language. In Japanese there are 48 phonetic characters in each of the Katagana and Hiragana character sets. In Korean there are 24 basic characters in the alphabet which characters are used in groups of two or three to make up the phonic sounds.

According to the preferred embodiment of the invention the mnemonic may consist of a phrase with the number of words in the phrase corresponding to the number of digits in the telephone number. The phonetic characters of the selected phonetic character set are associated with the various numerical digits of the keypad. A telephone number is dialed by dialing the phonetic character corresponding to the beginning of each word in the mnemonic phrase.

BRIEF DESCRIPTION OF THE DRAWINGS

The above and other features and advantages of this invention will be apparent from the following detailed specification taken in conjunction with the accompanying drawings, wherein:

FIG. 1 is an illustration of the phonetic characters corresponding to the Mandarin Chinese word "path";

FIG. 2 is a table illustrating a set of MNDP symbols for use in Mainland China;

FIG. 3 is a table illustrating a set of MNDP symbols for use in Taiwan;

FIGS. 4A and 4B are illustrations showing the relationship between mnemonic phrases, MNDP characters, and corresponding telephone numbers;

DETAILED DESCRIPTION OF THE PREFERRED EMBODIMENTS

Figure 5:
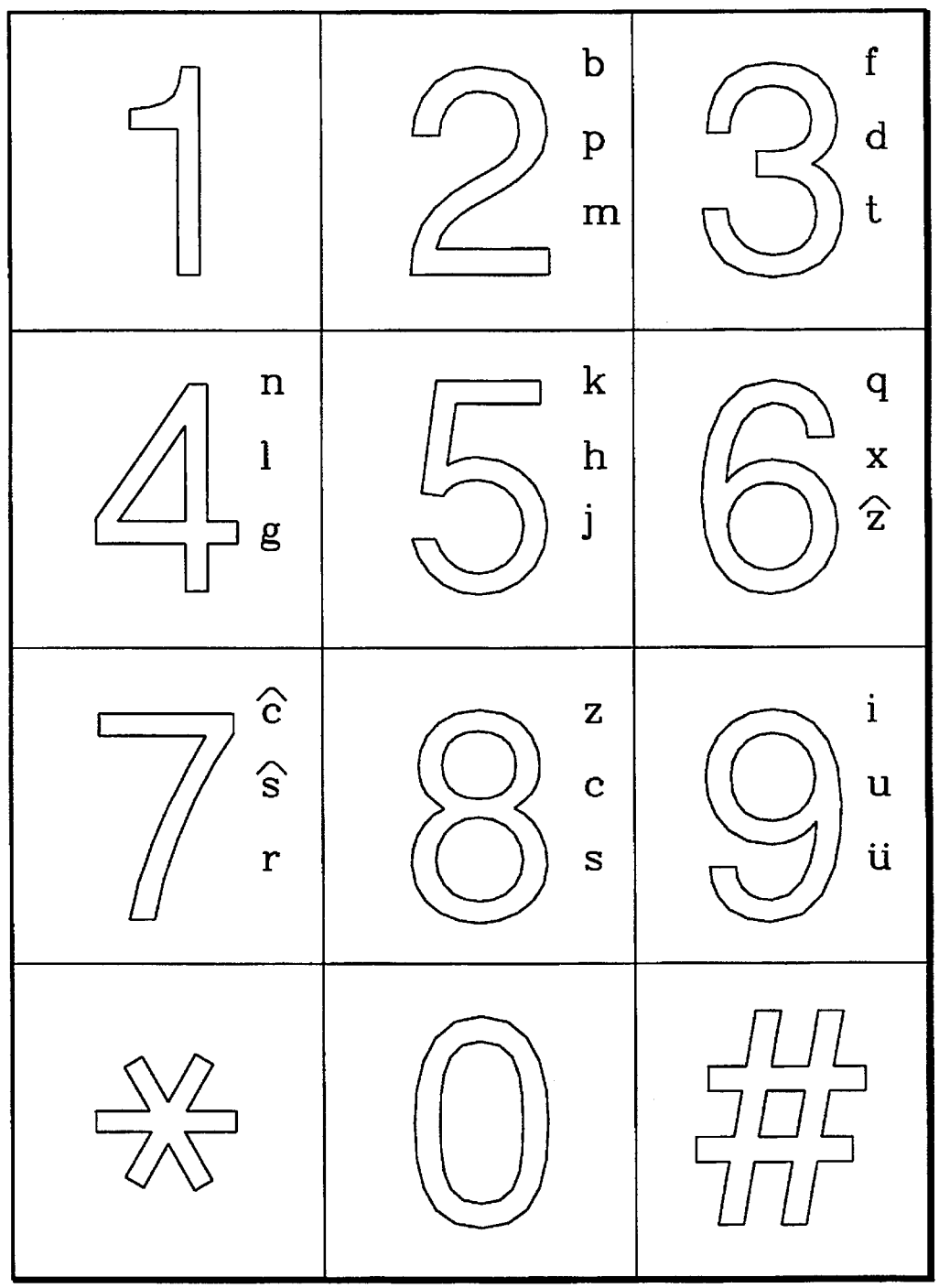
FIG. 5 illustrates a telephone keypad set according to the invention intended for use in Mainland China.

The relationship between the Mandarin Chinese characters, the Pingyin phonic characters used in Mainland China, the Taiwanese phonic characters used in Taiwan, and the MNDP characters according to this invention is illustrated in FIG. 1. The illustration is for the Mandarin Chinese word "path" which has a pronunciation lew in English. As shown in FIG. 1, the Chinese character for the word "path" is the same in Mainland China and in Taiwan. In Mainland China the corresponding phonetic representation is a pair of phonetic characters —lu— followed by an accent, whereas in Taiwan a different pair of phonetic characters followed by an accent are used. As shown in FIG. 1, the MNDP character used according to the invention is the leading character of the phonetic representation.

An MNDP character set according to this invention for use in Mainland China, where the Pingyin phonetic characters are used, is shown in FIG. 2 in chart form. The MNDP characters are each the leading character of a Pingyin character representation. As shown, 24 MNDP characters are used, whereas the complete phonetic character set includes 36 phonic characters. The selection procedure is to first select all the consonants and then, from the remaining vowels, select those used in the largest number of words. The selected 24 MNDP characters are distributed three each to the keypad digits 2 to 9. The characters could be distributed among the keys in any preferred manner. If desired, additional MNDP symbols could be assigned to the digits "0" and "1" and more than three symbols could be assigned to a particular key if desired.

An MNDP character set according to this invention for use in Taiwan where the Taiwanese phonetic characters are used is shown in FIG. 3. The selected MNDP characters are each the leading character of a phonetic character representation. Here again 24 MNDP characters are used, whereas the complete phonetic character set includes 35 phonic characters. All the consonants are selected first, then the most used vowels. The 24 MNDP characters are distributed three each to the keypad digits 2 to 9. Variations in the character distribution are possible so long as selection of a MNDP character always results in the dialing of a specific digit.

FIGS. 4A and 4B illustrate the manner in which a mnemonic phrase can be converted into an easy to remember telephone number. In FIG. 4A the mnemonic phrase in English is "THANK YOU FOR USING AT&T". The second line is the same phrase written in Chinese characters. The third line is the MNDP (M) String for use in Mainland China and the fourth line is the MNDP (T) String for use in Taiwan. The MNDP (M) String and the MNDP (T) String can be converted into the number 243-5664 using the tables in FIGS. 2 and 3, respectively. In FIG. 4B the mnemonic phrase in English is "PLEASE FLY CHINA AIRLINES". The second line is the same phrase written in Chinese characters. The third line is the MNDP (M) String for use in Mainland China and the fourth line is the MNDP (T) String for use in Taiwan. The MNDP (M) String and the MNDP (T) String in FIG. 4B can be converted into the number 638-5555 using the tables in FIGS. 2 and 3, respectively.

Figure 6:
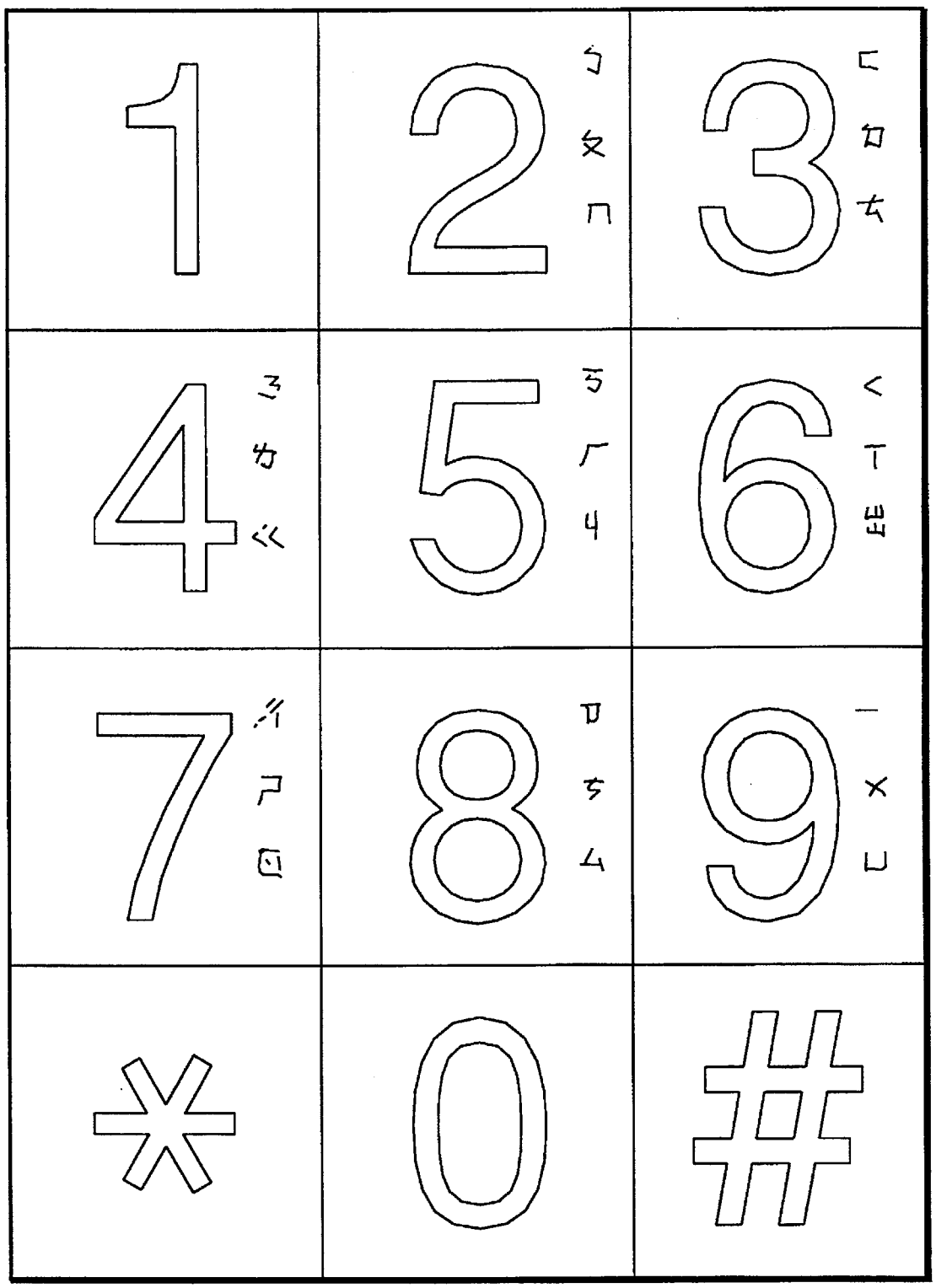
FIG. 6 illustrates a telephone keypad set according to the invention intended for use in Taiwan.

FIG. 5 illustrates a keypad layout corresponding to the MNDP (M) symbol chart in FIG. 2 for use in Mainland China. The keypad includes keys for the digits 0 to 9 as well as keys for the "*" and "#" symbols for a total of twelve keys. Three of the MNDP symbols are located on each of the keys associated with the digits 2 through 9. If desired, MNDP symbols could be located on the keys "0" and "1". Also, the MNDP symbols could be relocated to suit local preference. Similarly, FIG. 6 illustrates the keypad layout corresponding to the MNDP (T) symbol chart in FIG. 3 for use in Taiwan.

Although only a few illustrative preferred embodiments have been described in detail, it should be appreciated that there are numerous variations within the scope of this invention. In particular, similar systems can be developed for use in Japan or Korea. The invention is more particularly defined in the appended claims.

I claim:

1. A telephone with a keyset comprising
   a numerical key for each of the digits 0 to 9; unique phonetic characters associated with at least a plurality of said numerical keys; and
   said keys being part of a telephone such that dialing takes place as keys are depressed;
   whereby telephone dialing is achieved by dialing phonetic characters of a mnemonic.

2. The telephone with a keyset according to claim 1 wherein the mnemonic is a multi-word phrase with each word made up of one or more phonetic characters and wherein dialing is achieved by dialing the leading phonetic character of each word of said multi-word phrase.

3. The telephone keyset according to claim 1 wherein the number of phonetic characters is 24 with three of said phonetic characters being associated with each of said numerical keys for the digits 2 through 9.

4. The telephone with a keyset according to claim 1 wherein said phonetic characters correspond to the Mandarin Chinese characters.

5. The telephone with a keyset according to claim 4 wherein the Mandarin Chinese characters include consonants and vowels of different usage levels and wherein phonetic characters for association with numeric keys are selected by first selecting consonants and then selecting the most used vowels.

6. The telephone with a keyset according to claim 4 for Pingyin characters wherein said phonetic characters correspond to the Pingyin character set.

7. The telephone with a keyset according to claim 1 for Taiwanese characters wherein said phonetic characters correspond to the Taiwanese character set for Mandarin Chinese.

8. The telephone with a keyset according to claim 1 wherein said phonetic characters correspond to the Japanese Katagana character set.

9. The telephone with a keyset according to claim 1 wherein phonetic characters correspond to the Japanese Hiragana character set.

10. The telephone with a keyset according to claim 1 wherein said phonetic characters correspond to the Korean phonic character set.

* * * * *